US011834381B2

(12) United States Patent
Li et al.

(10) Patent No.: US 11,834,381 B2
(45) Date of Patent: Dec. 5, 2023

(54) ROOM TEMPERATURE CURABLE QUICK-SETTING HIGH-STRENGTH ALKALI-ACTIVATED FLY ASH CEMENTITIOUS MATERIAL AND PREPARATION METHOD THEREOF

(71) Applicant: XI'AN UNIVERSITY OF ARCHITECTURE AND TECHNOLOGY, Xi'an (CN)

(72) Inventors: Hui Li, Xi'an (CN); Huimei Zhu, Xi'an (CN); Yuwen Zhang, Xi'an (CN); Xindong Zhang, Xi'an (CN); Chen Yu, Xi'an (CN); Jia'ni Chen, Xi'an (CN)

(73) Assignee: XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 18/115,070

(22) Filed: Feb. 28, 2023

(65) Prior Publication Data

US 2023/0278920 A1 Sep. 7, 2023

(30) Foreign Application Priority Data

Mar. 7, 2022 (CN) ......................... 202210223300.0

(51) Int. Cl.
*C04B 7/24* (2006.01)
*C04B 7/52* (2006.01)

(52) U.S. Cl.
CPC .............. *C04B 7/243* (2013.01); *C04B 7/527* (2013.01)

(58) Field of Classification Search
None
See application file for complete search history.

(56) References Cited

U.S. PATENT DOCUMENTS

| | | | | |
|---|---|---|---|---|
| 5,501,277 | A * | 3/1996 | Onan ....................... | C09K 8/46 166/292 |
| 8,318,642 | B2 * | 11/2012 | Roddy .................. | C04B 28/021 507/224 |
| 9,321,681 | B2 * | 4/2016 | Dubey .................. | C04B 28/008 |
| 9,890,082 | B2 * | 2/2018 | Dubey .................. | C04B 28/006 |
| 2009/0139719 | A1 * | 6/2009 | Luo .......................... | C09K 8/80 166/280.2 |
| 2017/0334779 | A1 * | 11/2017 | Gong ....................... | C09K 8/42 |

FOREIGN PATENT DOCUMENTS

| | | | |
|---|---|---|---|
| CN | 101367631 A | | 2/2009 |
| CN | 101921092 A | * | 12/2010 |
| CN | 110255995 A | | 9/2019 |

* cited by examiner

*Primary Examiner* — John J Figueroa
(74) *Attorney, Agent, or Firm* — Kaplan Breyer Schwarz, LLP; Stuart H. Mayer

(57) ABSTRACT

Disclosed are a room temperature curable quick-setting high-strength alkali-activated fly ash (AAFA) cementitious material and a preparation method thereof, belonging to the technical field of building materials. The raw materials include: in parts by mass, 30-50 parts of undisturbed fly ash, 50-70 parts of highly reactive ultra-fine fly ash, and 12-18 parts of sodium hydroxide. Specifically, the AAFA with fast setting and high strength for room temperature curing is prepared by pretreatment of fly ash with sodium hydroxide exciter, based on a premise that the raw material system and preparation process are simplified and feasible.

6 Claims, 3 Drawing Sheets

ROOM TEMPERATURE CURABLE QUICK-SETTING HIGH-STRENGTH ALKALI-ACTIVATED FLY ASH CEMENTITIOUS MATERIAL AND PREPARATION METHOD THEREOF

CROSS-REFERENCE TO RELATED APPLICATIONS

This application claims priority to Chinese Patent Application No. 202210223300.0, filed on Mar. 7, 2022, the contents of which are hereby incorporated by reference.

TECHNICAL FIELD

The present application relates to the technical field of building materials, and in particular to a room temperature curable quick-setting high-strength alkali-activated fly ash cementitious material and preparation method thereof.

BACKGROUND

Fly ash is one of the major by-products of coal-fired power generation in thermal power plants, and the mass utilization of fly ash in the field of building materials is an important contribution to the sustainable development of the thermal energy and building materials industries in the context of the carbon peaking and carbon neutrality goals in China. The silicate-aluminate glass body in fly ash forms an amorphous three-dimensional network structure under the action of an alkaline activator, and the prepared alkali-activated fly ash (AAFA) cementitious material serves as a substitute for silicate cement with excellent performance in chemical corrosion resistance, high temperature resistance and curing of heavy metals. In addition to replacing silicate cement, AAFA can also be used to reduce energy consumption and $CO_2$ emissions in the construction materials sector, thereby enabling the recycling of solid waste.

Nevertheless, because of the low $CaO/SiO_2$ content in fly ash, it is difficult to activate the $[SiO_4]^{4-}$ in glass by alkaline exciters at room temperature due to the high degree of polymerization and the high activation energy of depolymerization, and it usually takes several days for AAFA to set and cure at a room temperature. As a result, high-temperature curing is often adopted to have early strength; however, this increases the overall energy consumption of AAFA products and is limited to application in prefabricated components.

In view of the ability of silicate to accelerate the formation of silica-aluminous (N-A-S-H) gels of the AAFA polymerization product phase, it is currently a common practice to prepare AAFA at a room temperature by using sodium hydroxide with high modulus sodium silicate as a composite alkaline exciter and mixing fly ash with a more reactive material (e.g. blast furnace slag). However, the AAFA usually offers poor processability when the sodium silicate solution is of high viscosity, and there is currently no corresponding water reducing agent; furthermore, the AAFA is prone to a large scale of shrinkage as a result of the low orderliness and high contents of Al and Ca/Si in the C-A-S-H gel, a sodium silicate excited slag product; therefore, it is obvious that the AAFA prepared at a room temperature cannot be applied in a large scale in a short period of time in terms of process and performance.

SUMMARY

Based on the above background and with the premise of simplifying the raw material system and preparation process, highly reactive ultra-fine fly ash is adopted as a main raw material for preparing alkali-activated fly ash (AAFA), taking into account the following characteristics of the highly reactive ultra-fine fly ash obtained by grinding, including: broken surface chemical bonds, resulting in a significant increase in surface defects and active sites; significantly increased specific surface area and surface free energy, which in turn increases its chemical instability and its solid-liquid reaction interface with alkali-excited solutions; and a certain degree of depolymerization and amorphization caused by distortions and defects in the internal primary lattice. Therefore, it is expected to accelerate the "deconstruction-reconstruction-coalescence-crystallization" polymerization reaction of AAFA to prepare a room temperature curable quick-setting high-strength AAFA cementitious material, which sets rapidly and achieves high early and late strength at room temperature, thereby eliminating the existing high-temperature curing steps and broadening the application of the material in on-site construction projects.

One of the technical schemes of the present application provides a room temperature curable quick-setting high-strength AAFA cementitious material, prepared by mixing a pre-activated solution with undisturbed fly ash and highly reactive ultra-fine fly ash, where the pre-activated solution is prepared by mixing sodium hydroxide aqueous solution and highly reactive ultra-fine fly ash.

Optionally, raw materials include: in parts by mass, water, undisturbed fly ash 30-50 parts, highly reactive ultra-fine fly ash 50-70 parts, and sodium hydroxide 12-18 parts.

Optionally, the undisturbed fly ash is class I fly ash; and the highly reactive ultra-fine fly ash is a product of the undisturbed fly ash being ball-milled to a median particle size of 2-3 micrometers (μm), with a specific surface area of not less than 624.36 square meter per kilogram ($m^2/kg$).

Another technical scheme of the present application provides a preparation method of the room temperature curable quick-setting high-strength AAFA cementitious material, including:

(1) mixing sodium hydroxide and 2-3 parts of highly reactive ultra-fine fly ash raw materials to prepare a pre-activated solution; and (2) mixing the pre-activated solution with undisturbed fly ash and a remaining highly reactive ultra-fine fly ash, stirring and sampling, and curing to obtain the AAFA cementitious material.

Optionally, the step (1) specifically includes: adding water to sodium hydroxide to prepare a sodium hydroxide solution, adding 2-3 parts of highly reactive ultra-fine fly ash raw materials into the sodium hydroxide solution, followed by heating and stirring at 70-90 degrees Celsius (° C.) and 600-1,000 revolutions per minute (r/min) for 15-25 min to obtain the pre-activated solution; optionally, the sodium hydroxide is in a mass ratio of (13-17):35 to the water.

Optionally, the curing in the step (2) is carried out under conditions of normal temperature curing.

Optionally, the curing in the step (2) is carried out under conditions of 20±3° C. and 60±5 relative humidity in percent (RH. %).

Compared with the prior art, the present application has the beneficial effects that:

amorphous silica/aluminum gel is the main polymerization product of AAFA and the most important source of the coagulation and strength development; according to the present application, the highly reactive ultra-fine fly ash is pre-activated by sodium hydroxide solution to induce a polymerization reaction to produce a silica/ aluminum gel, and the pre-activated solution of sodium hydroxide containing the silica/aluminum gel is then used as an alkaline activator to blend with the mixture of undisturbed fly ash and the highly reactive ultra-fine fly ash; on the one hand, the silica/aluminum gel in the pre-activated solution is incorporated into an AAFA slurry as a crystal nucleus to reduce the nucleation barrier of the N-A-S-H gel during the polymerization process, thereby accelerating the polymerization reaction, and the larger specific surface area facilitates the adsorption of ions, resulting in a more diffused distribution of the polymerization products in the overall reaction system, which in turn increases the density; on the other hand, the milled ultra-fine fly ash contains a large number of debris and smaller particles, and the amounts of surface structural defects and broken and unsaturated bonds are increased, making it possible to significantly accelerate the polymerization reaction rate of the AAFA system by replacing the undisturbed fly ash with some of the highly reactive ultra-fine fly ash in equal amounts; and based on scientific research and practical tests, the above two accelerating effects of the polymerization reaction given by the pre-activation process and the highly reactive ultra-fine fly ash are jointly utilized to prepare AAFA with rapid polymerization reaction at a room temperature and fast-setting and early-strength properties, which is expected to be applied in a large scale in field construction.

DETAILED DESCRIPTION OF THE EMBODIMENTS

Various exemplary embodiments of the present application are now described in detail and this detailed description should not be considered as limiting the present application, but should be understood as a rather detailed description of certain aspects, features and embodiments of the present application.

It should be understood that the terms described in the present application are intended to describe particular embodiments only and are not intended to limit the present application. Furthermore, with respect to the range of values in the present application, it is to be understood that each intermediate value between the upper and lower limits of the range is also specifically disclosed. Each smaller range between any stated value or intermediate value within a stated range and any other stated value or intermediate value within a stated range is also included in the present application. The upper and lower limits of these smaller ranges may be independently included or excluded from the scope.

Unless otherwise indicated, all technical and scientific terms used herein shall have the same meaning as would be commonly understood by those skilled in the art in the field described in the present application. Although the present application describes only preferred methods and materials, any methods and materials similar or equivalent to those described herein may also be used in the implementation or testing of the present application. All literature referred to in this specification is incorporated by reference for the purpose of disclosing and describing the methods and/or materials associated with the literature. In the event of conflict with any incorporated literature, the contents of this specification shall prevail.

Without departing from the scope or spirit of the present application, various improvements and variations are available to specific embodiments of the specification of the present application, as will be apparent to those skilled in the art. Other embodiments derived from the specification of the present application are obvious to the skilled person. The specification and embodiments of the present application are exemplary only.

As used herein, the words “comprising”, “including”, “having”, “containing”, etc., are open-ended terms, i.e. meaning including but not limited to.

Figure 2:
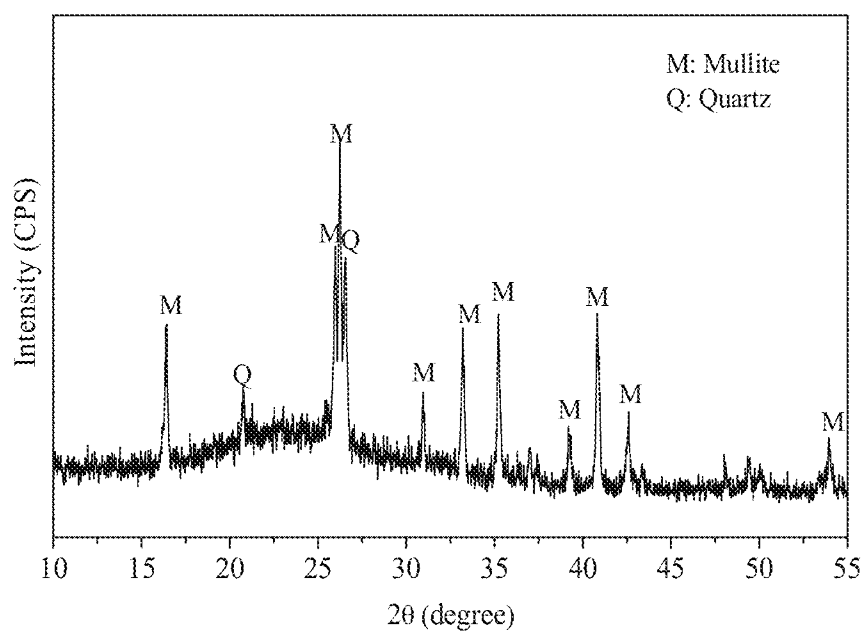
FIG. 2 is an X-Ray Diffraction (XRD) pattern of undisturbed fly ash used in an embodiment of the present application.
Figure 3:
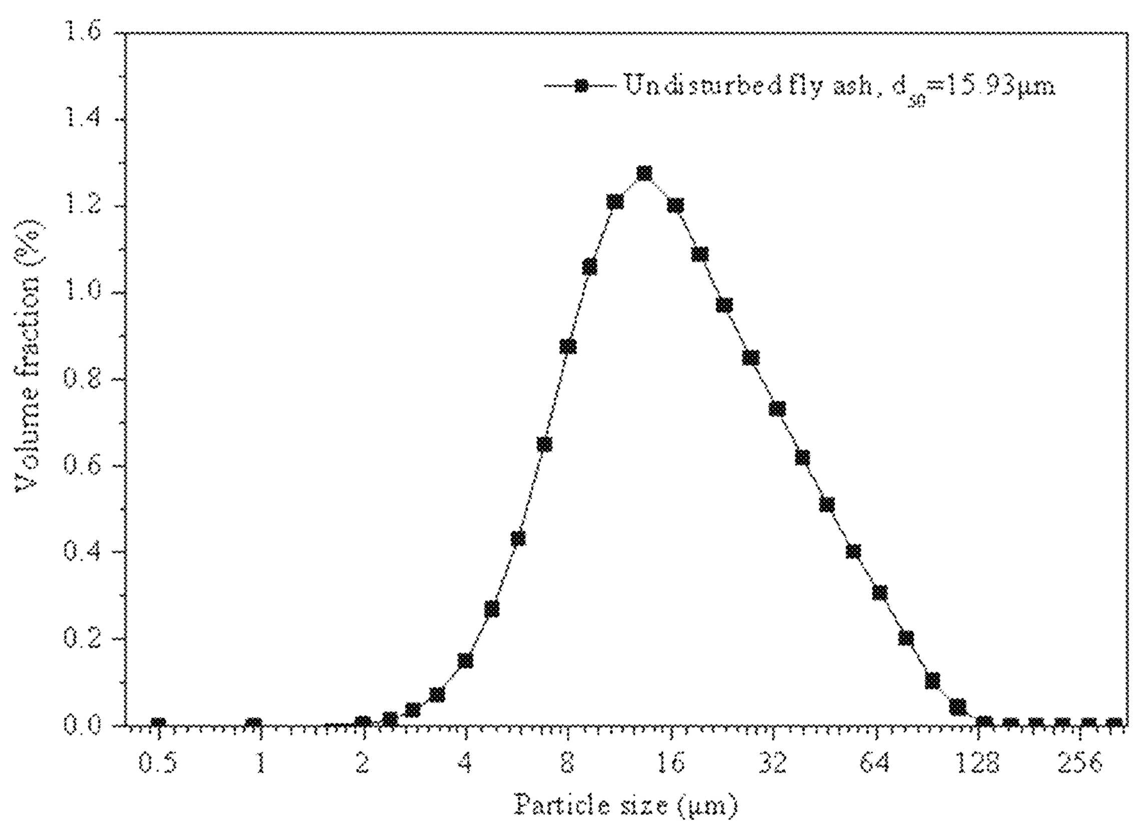
FIG. 3 shows a particle size distribution of the undisturbed fly ash used in an embodiment of the present application.

The raw materials and properties used in the following embodiments of the present application are as follows:

undisturbed fly ash: Grade I fly ash which is a by-product of coal-fired power plants and meets the requirements of GB/T 1596-2017 Fly Ash Used for Cement and Concrete, with chemical composition, mineral phase and particle size distribution as shown in Table 1, FIG. 2 and FIG. 3 respectively.

TABLE 1

Chemical composition of undisturbed fly ash

| | $SiO_2$ | $Al_2O_3$ | $Fe_2O_3$ | CaO | $K_2O$ |
|---|---|---|---|---|---|
| Undisturbed fly ash | 47.06 | 33.10 | 4.18 | 3.86 | 1.93 |
| | MgO | $TiO_2$ | $Na_2O$ | $SO_3$ | LOI |
| Undisturbed fly ash | 0.88 | 1.06 | 0.78 | 0.58 | 1.38 |

Highly reactive ultra-fine fly ash: median particle size ($d_{50}$) of 2-3 micrometers (μm), specific surface area of not less than 624.36 square meter per kilogram ($m^2/kg$), obtained by grinding Class I fly ash finely using a ball mill.

Sodium hydroxide: commercially available industrial flake alkali with solid mass fraction greater than 96 weight percentage (wt. %).

Water: tap water.

Embodiments 1-4

The Embodiments 1-4 provide a room temperature curable quick-setting high-strength alkali-activated fly ash (AAFA) cementitious material and preparation method thereof, including raw materials with the following components: 30-50 parts of undisturbed fly ash, 50-70 parts of highly reactive ultra-fine fly ash and 12-18 parts of sodium hydroxide (see Table 2 for details).

Figure 1:
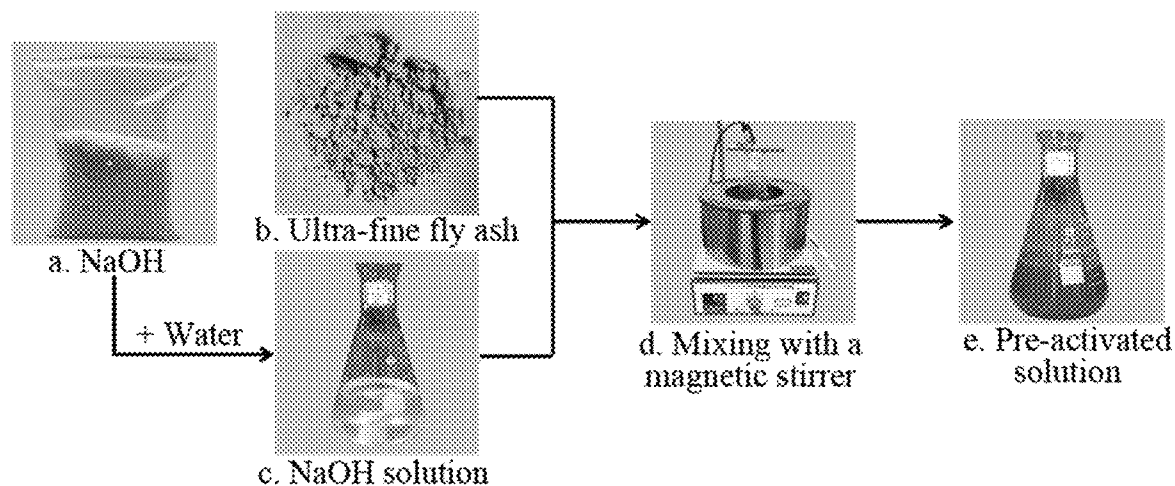
FIG. 1 is a process of preparing pre-activated solution according to an embodiment of the present application.

The preparation method specifically includes two steps:

(1) preparation of pre-activated solution: 2-3 parts of highly reactive ultra-fine fly ash are added into a prepared sodium hydroxide solution, dissolved and heated for 20 minutes (min) at 80 degrees Celsius (° C.) and 800 revolutions per minute (r/min) by a magnetic stirrer, and the pre-activated solution is obtained after cooling; see FIG. 1 for a specific process;

(2) preparation and curing of AAFA cementitious materials: the pre-activated solution is used as an alkaline activator to mix with the remaining fly ash raw materials, followed by stirring and sampling, then the curing is carried out under normal temperature with temperature and humidity conditions of (20±3°) C. and 60±5 relative humidity in percent (RH. %).

TABLE 2

Proportion for pre-activated normal temperature curing of AAFA (in parts by mass)

| | Pre-activated solution | | | | |
|---|---|---|---|---|---|
| Raw materials | Highly reactive ultra-fine fly ash | Sodium hydroxide | Water | Undisturbed fly ash | Highly reactive ultra-fine fly ash |
| Embodiment 1 | 2.1 | 13 | 35 | 32 | 65.9 |
| Embodiment 2 | 2.5 | 15 | 35 | 40 | 57.5 |
| Embodiment 3 | 2.8 | 17 | 35 | 50 | 47.2 |
| Embodiment 4 | 2.3 | 17 | 35 | 35 | 62.7 |

The AAFA slurries produced in Embodiments 1-4 above are tested for performance by means of the following performance tests:

vicat apparatus is used for measuring the setting time, where the initial setting time is defined as the initial setting needle sinking into the round mould of the AAFA net slurry sample 3-5 milliliters (mm) from the bottom of the glass plate, the final setting time is determined as the final setting needle sinking into the surface of the sample to a depth of less than 0.5 mm, and the compressive strength of the test block is tested using a fully automatic pressure tester with a loading rate of 2.4 kilonewtons per second (kN/s), the results are shown in Table 3.

TABLE 3

Performance test results of AAFA slurries

| | Setting time (min) | | Compressive strength (MPa) | | |
|---|---|---|---|---|---|
| Item | Initial setting time | Final setting time | Day 3 | Day 7 | Day 28 |
| Embodiment 1 | 31 | 39 | 11.81 | 13.16 | 39.44 |
| Embodiment 2 | 27 | 32 | 13.53 | 20.32 | 41.75 |
| Embodiment 3 | 40 | 48 | 9.57 | 11.64 | 35.84 |
| Embodiment 4 | 15 | 18 | 18.89 | 22.49 | 45.54 |

As can be seen from the results, according to the room temperature curable quick-setting high-strength AAFA cementitious material and preparation method, AAFA that can be quickly cured at room temperature with high early strength is prepared by combining the pre-activated solution and ultra-fine fly ash; in addition to meeting the requirements of field construction, the step of steam curing is avoided, with advantages of low energy consumption and low carbon footprint for prefabricated components.

Comparative Embodiment 1

The present comparative embodiment is different from the Embodiment 4 in that the preparation of the pre-activated solution is omitted and the sample is prepared by mixing the sodium hydroxide solution with the undisturbed fly ash and the highly reactive ultra-fine fly ash directly, followed by normal temperature curing at (20±3°) C. and 60±5 RH. %.

The results show that the initial setting time is 29 min, the final setting time is 36 min, and the compressive strength is 12.95 megapascals (MPa) on day 3, 14.12 MPa on day 7 and 38.97 MPa on day 28 respectively.

Comparative Embodiment 2

As comparing to the Embodiment 4, the present comparative embodiment is different in that the pre-activated solution is prepared by mixing 5 parts of highly reactive ultra-fine fly ash with sodium hydroxide solution in the preparation process.

The results show that the initial setting time is 20 min, the final setting time is 29 min, and the compressive strength is 15.04 MPa on day 3, 18.57 MPa on day 7 and 40.83 MPa on day 28 respectively.

Comparative Embodiment 3

As comparing to the Embodiment 4, the present comparative embodiment is different in that all the raw materials of highly reactive ultra-fine fly ash are replaced with the same amount of undisturbed fly ash, and the results indicate that the initial setting time is 3,118 min, the final setting time is 3,153 min, and there is no developing of strength on day 3, the compressive strengths on day 7 and day 28 are 0.5 MPa and 3.1 MPa respectively.

Comparative Embodiment 4

In contrast with the Embodiment 4, the raw material of highly reactive ultra-fine fly ash mixed with sodium hydroxide is replaced by the same amount of undisturbed fly ash in the present comparative embodiment, that is, 17 parts of sodium hydroxide and 35 parts of water are prepared into sodium hydroxide solution, then 2.3 parts of undisturbed fly ash are added to prepare pre-activated solution, and then mixed with 32.7 parts of undisturbed fly ash and 65 parts of highly reactive ultra-fine fly ash to prepare samples.

The results are as follows: the initial setting time is 26 min, the final setting time is 34 min, and the compressive strength is 13.28 MPa on day 3, 14.33 MPa on day 7 and 39.17 MPa on day 28.

The statements above are only preferred embodiments of the present application and are not intended to limit the present application. Any modifications, equivalent substitutions and improvements made within the spirit and principles of the present application shall be included within the scope of protection of the present application.

What is claimed is:

1. A room temperature curable quick-setting high-strength alkali-activated fly ash cementitious material, wherein raw materials of the cementitious material only comprise: in parts by mass, water, undisturbed fly ash 30-50 parts, highly reactive ultra-fine fly ash 50-70 parts, and sodium hydroxide 12-18 parts, wherein the cementitious material is prepared by mixing the sodium hydroxide with 2-3 parts of the highly reactive ultra-fine fly ash to obtain a pre-activated solution, and mixing the obtained pre-activated solution with the undisturbed fly ash, and the rest of the highly reactive ultra-fine fly ash, wherein the undisturbed fly ash is class I fly ash, and the highly reactive ultra-fine fly ash is a product of the undisturbed fly ash being ball-milled to a median particle size of 2-3 micrometers (μm) with a specific surface area of not less than 624.36 $m^2$/kg.

2. A preparation method of the room temperature curable quick-setting high-strength alkali-activated fly ash cementitious material according to claim 1, comprising:

(1) mixing sodium hydroxide and 2-3 parts of highly reactive ultra-fine fly ash raw materials to prepare a pre-activated solution; and (2) mixing the pre-activated solution with undisturbed fly ash and a remaining highly reactive ultra-fine fly ash, stirring and sampling, and curing to obtain the alkali-activated fly ash cementitious material.

3. The preparation method of the room temperature curable quick-setting high-strength alkali-activated fly ash cementitious material according to claim 2, wherein the step (1) specifically comprises: adding water into sodium hydroxide to prepare a sodium hydroxide solution, adding 2-3 parts of the highly reactive ultra-fine fly ash raw material into the sodium hydroxide solution, and heating and stirring at 70-90° C. and 600-1,000 r/min for 15-25 min to obtain the pre-activated solution.

4. The preparation method of the room temperature curable quick-setting high-strength alkali-activated fly ash cementitious material according to claim 3, wherein the sodium hydroxide is in a mass ratio of (13-17):35 to the water.

5. The preparation method of the room temperature curable quick-setting high-strength alkali-activated fly ash cementitious material according to claim 2, wherein the curing in the step (2) is normal temperature curing.

6. The preparation method of the room temperature curable quick-setting high-strength alkali-activated fly ash cementitious material according to claim 2, wherein the curing conditions in the step (2) are 20±3° C. and 60±5 RH.%.

* * * * *